(12) United States Patent
Frederickson et al.

(10) Patent No.: US 12,139,077 B2
(45) Date of Patent: Nov. 12, 2024

(54) IN-DOOR ACCESSORY CHARGER

(71) Applicant: Rivian IP Holdings, LLC, Plymouth, MI (US)

(72) Inventors: Austin Frederickson, Carlsbad, CA (US); Ivan Sanchez, Irvine, CA (US); Mike Selle, Holland, MI (US); William David Blair, Holland, MI (US); Garrett Lewis, Allegan, MI (US); Rick Alan Anderson, Grand Haven, MI (US); Alexander Ursin, Portland, OR (US); Scott Pontoni, Portland, OR (US); Jason Hilbourne, Portland, OR (US)

(73) Assignee: Rivian IP Holdings, LLC, Plymouth, MI (US)

( * ) Notice: Subject to any disclaimer, the term of this patent is extended or adjusted under 35 U.S.C. 154(b) by 479 days.

(21) Appl. No.: 17/403,999

(22) Filed: Aug. 17, 2021

(65) Prior Publication Data
US 2023/0034903 A1 Feb. 2, 2023

Related U.S. Application Data

(60) Provisional application No. 63/226,690, filed on Jul. 28, 2021.

(51) Int. Cl.
*B60R 11/06* (2006.01)
*B60L 1/00* (2006.01)
(Continued)

(52) U.S. Cl.
CPC ............. *B60R 11/06* (2013.01); *B60L 1/006* (2013.01); *B60Q 3/88* (2017.02); *B60R 16/033* (2013.01);
(Continued)

(58) Field of Classification Search
CPC ......................................................... B60L 1/006
(Continued)

(56) References Cited

U.S. PATENT DOCUMENTS 5,077,643 A * 12/1991 Leach .................... B60Q 1/324
362/183
8,141,933 B2 * 3/2012 Nakamura ............... E05B 85/10
296/146.7

(Continued)

FOREIGN PATENT DOCUMENTS

CN 2863580 Y * 1/2007
DE 102005059726 A1 * 6/2007 ............. B60R 7/046

OTHER PUBLICATIONS

Ferris, D.J., "Rivian's door flashlight uses the same 2170 battery as its car batteries, and that's cool", Teslarati, Apr. 22, 2019, pp. 1-10, Online Available at:https://web.archive.org/web/20190422225845/https://www.teslarati.com/rivian-ny-auto-show-door-flashlight-2170-battery-blog/.
(Continued)

*Primary Examiner* — Amy R Weisberg
*Assistant Examiner* — Veronica M Shull
(74) *Attorney, Agent, or Firm* — Haley Guiliano LLP

(57) ABSTRACT

An example apparatus includes a cavity defined by a vehicle door, with the cavity being configured to stow and charge an accessory device. The apparatus may also include an accessory cradle movable within the cavity and configured to retain the vehicle accessory. Examples of a method may include providing a cavity in an end portion of a vehicle door, with the cavity being configured to stow and charge an accessory device. The method may further include installing an accessory cradle within the cavity, with the accessory cradle being movable within the cavity and configured to retain the vehicle accessory.

19 Claims, 12 Drawing Sheets

(51) Int. Cl.
*B60Q 3/88* (2017.01)
*B60R 11/00* (2006.01)
*B60R 16/033* (2006.01)
*F21L 4/08* (2006.01)
*F21V 21/14* (2006.01)

(52) U.S. Cl.
CPC ............ *F21L 4/085* (2013.01); *F21V 21/145* (2013.01); *B60R 2011/0021* (2013.01); *B60R 2011/0047* (2013.01); *B60R 2011/0084* (2013.01)

(58) Field of Classification Search
USPC .......... 296/37.1, 37.13, 37.8, 37.12; 362/183
See application file for complete search history.

(56) References Cited

U.S. PATENT DOCUMENTS

| | | | | |
|---|---|---|---|---|
| 9,598,024 B2* | 3/2017 | Kogut | ............ | B60R 11/00 |
| 9,783,123 B2* | 10/2017 | Hélot | ............ | B60R 11/0252 |
| 9,849,843 B2* | 12/2017 | Kogut | ............ | B60R 11/06 |
| 9,855,891 B2* | 1/2018 | Tassy | ............ | B60Q 3/59 |
| 11,027,670 B1* | 6/2021 | Tait | ............ | H02J 7/02 |
| 2003/0026092 A1* | 2/2003 | Reese | ............ | F21L 4/027 |
| | | | | 320/167 |
| 2007/0133219 A1* | 6/2007 | Chaloult | ............ | B60Q 3/59 |
| | | | | 362/183 |

OTHER PUBLICATIONS

Graham, A. "Does a Rolls-Royce Come With an Umbrella?", Luxury Viewer, Dec. 10, 2020, 4 pages, Online Available at: https://web.archive.org/web/20201210083947/https://luxuryviewer.com/does-a-rolls-royce-come-with-an-umbrella/.

* cited by examiner

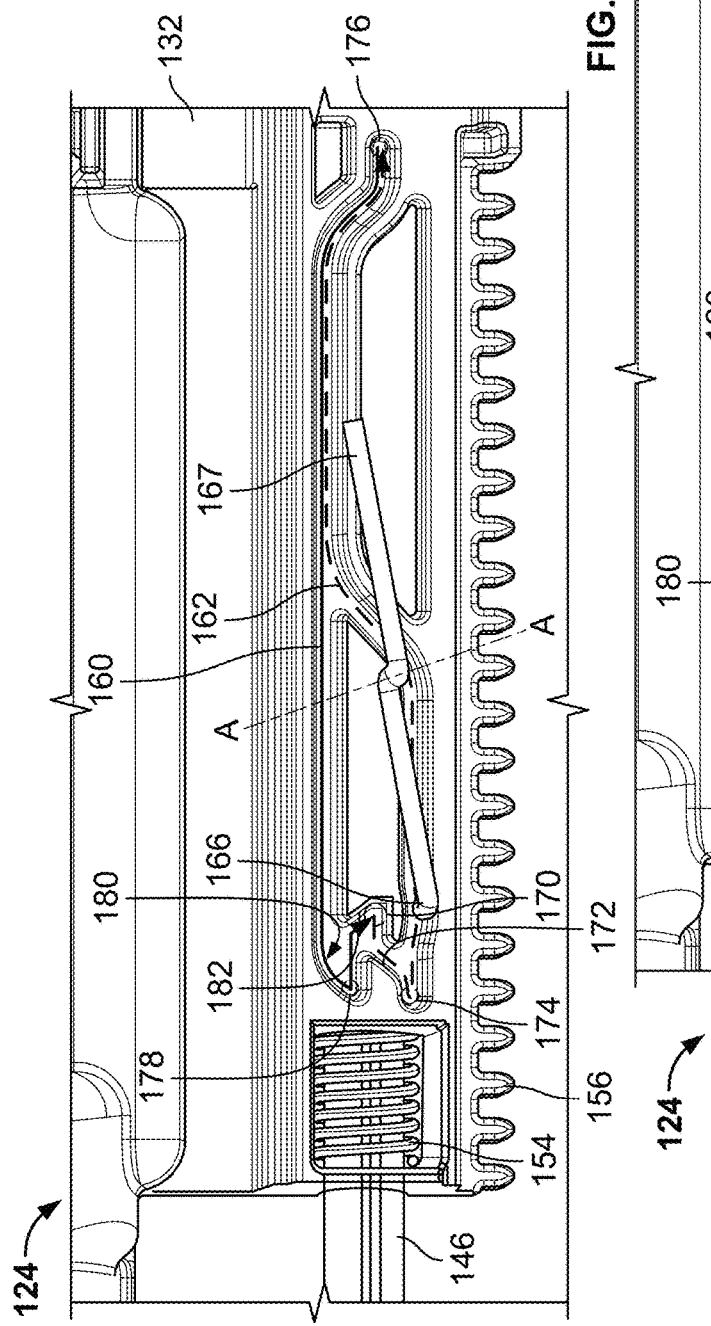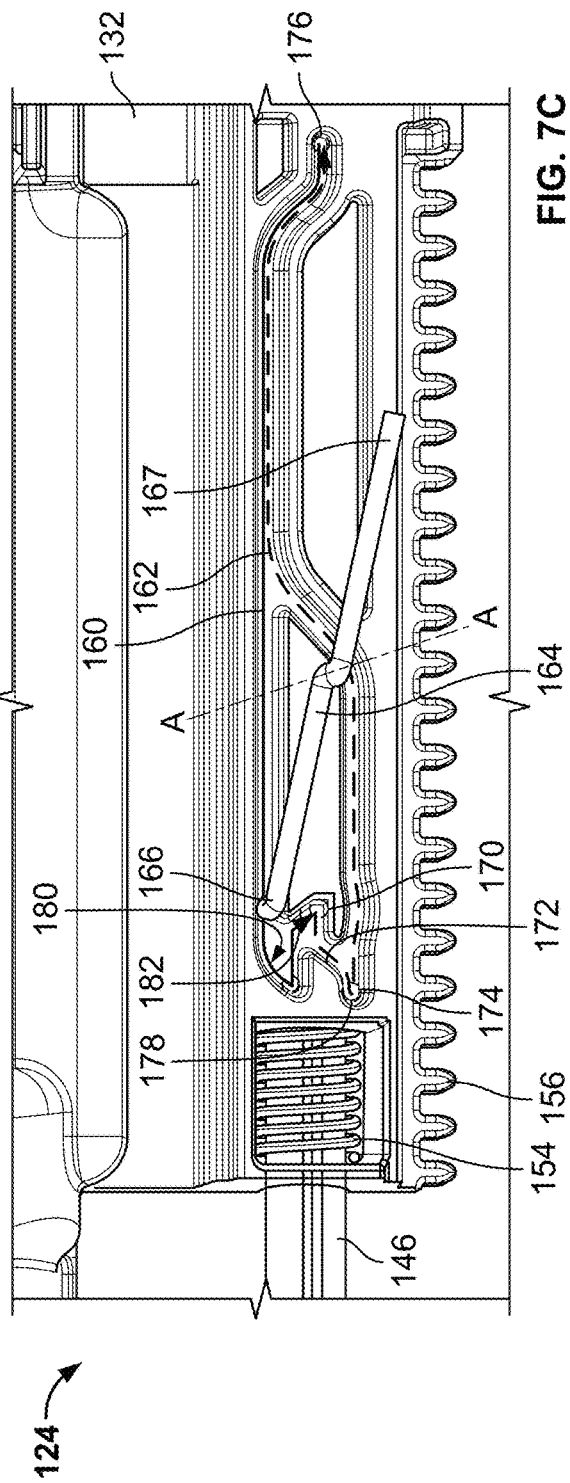

IN-DOOR ACCESSORY CHARGER

CROSS-REFERENCE TO RELATED APPLICATION

This application claims priority to U.S. Provisional Patent Application Ser. No. 63/226,690, filed on Jul. 28, 2021, the contents of which are hereby expressly incorporated by reference in their entirety.

INTRODUCTION

The present disclosure is directed to a vehicle door having a storage cavity, and more particularly to a storage cavity that provides electronic charging of an accessory device stowed within the cavity.

SUMMARY

In at least some example approaches, an apparatus may include a cavity defined by a vehicle door, with the cavity being configured to stow and charge an accessory device. The apparatus may also include an accessory cradle movable within the cavity and configured to retain the vehicle accessory.

In at least some example approaches, an apparatus includes a cavity defined by an end portion of a vehicle door, with the cavity being configured to stow and charge an accessory device. The apparatus may also include an accessory cradle movable within the cavity and configured to retain the vehicle accessory, and a support configured to be mounted within the vehicle door, with the support defining in part the cavity. The accessory cradle may be movable with respect to the support. The apparatus may also include a stowing track and a deployment track, each of the stowing track and deployment track defined by one of the support or the accessory cradle, the stowing track configured to delimit movement of the accessory cradle within the cavity when the accessory device is inserted into the cavity, the deployment track configured to delimit movement of the accessory cradle when the accessory device is withdrawn from the cavity.

In at least some example illustrations, a method includes providing a cavity in an end portion of a vehicle door, with the cavity being configured to stow and charge an accessory device. The method may further include installing an accessory cradle within the cavity, with the accessory cradle being movable within the cavity and configured to retain the vehicle accessory.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 7B shows an enlarged right-side perspective view of the stowing track and deployment track of FIG. 7A, with the engagement end of the rotatable pin in the deployment track, according to an example;

FIG. 7C shows an enlarged right-side perspective view of the stowing track and deployment track of FIGS. 7A and 7B, with the engagement end of the rotatable pin in the stowing track, according to an example;

DETAILED DESCRIPTION

Figure 1:
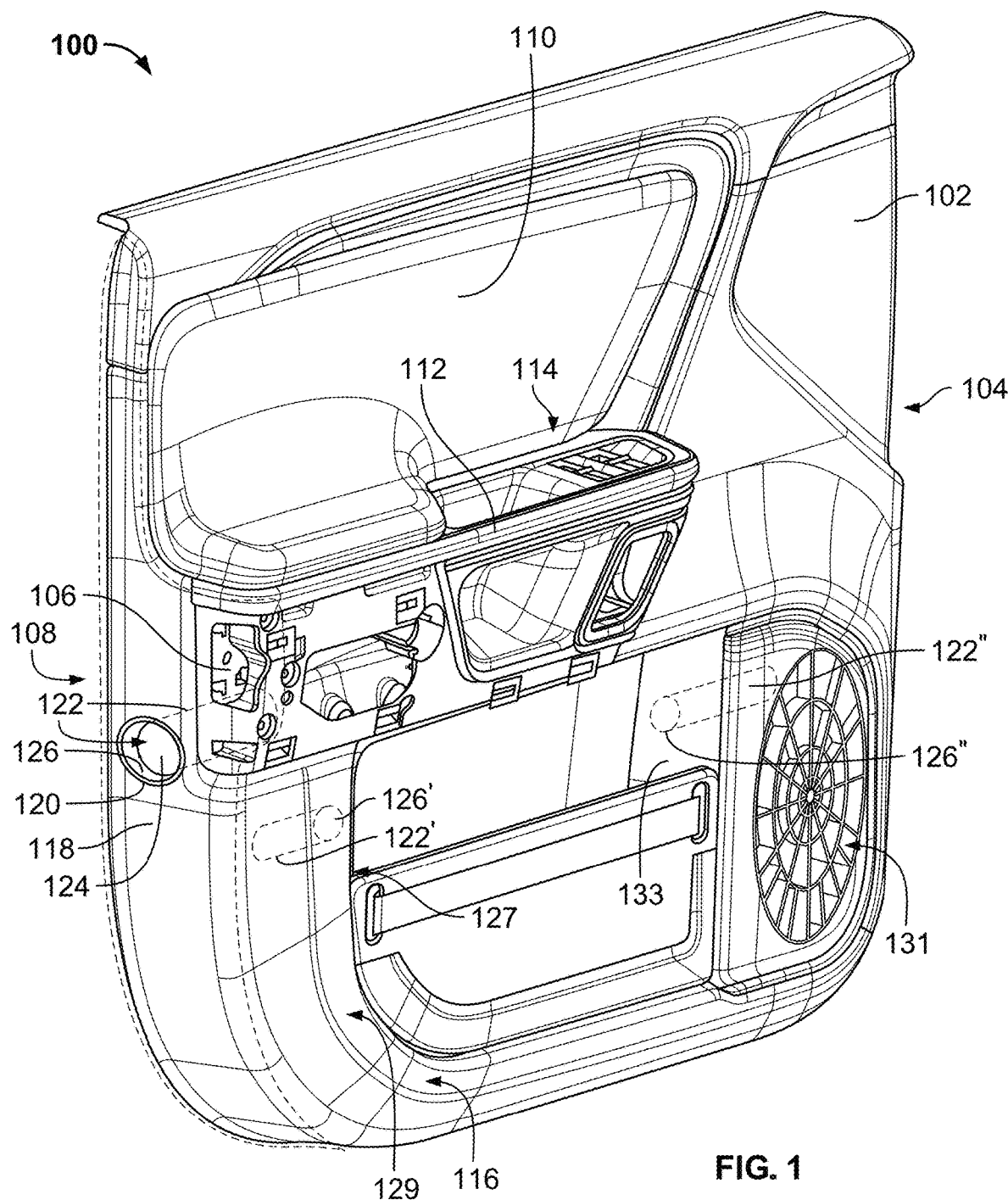
FIG. 1 shows a right-rear perspective view of a left/driver's-side vehicle door having a cavity for storing an accessory device, according to an example approach.

Vehicle manufacturers may require storage for accessories or cargo. Some accessories may be powered, e.g., with a battery/batteries. However, accessory products typically do not have a defined home in the vehicle, and do not have an integrated charging system or are charged through use of tethered charging cables. This increases clutter within the vehicle and reduces the convenience and utility of powered accessories.

In example illustrations herein, a storage area is provided in the vehicle for an accessory, e.g., a flashlight, which provides secure storage of the accessory when not in use, and also charges the accessory. In some example illustrations, a flashlight is stowed in a vehicle door, e.g., the driver-side door, and as such is conveniently located when a driver of the vehicle needs light, either within the vehicle or upon exiting the vehicle. Example accessories are not limited to flashlights, however, and may include, for example, a battery or charging bank for a mobile device. Example storage areas may be placed in a vehicle door, e.g., at an end of the door, in a map pocket, or anywhere else that is convenient for stowing and accessing the accessory device.

As will be described further below, an example accessory storage apparatus may be provided in a vehicle door and may have a charging module for supplying power to an accessory device. The apparatus may include a housing or support, e.g., in multiple parts that are joined together within a door panel assembly to define a cavity for receiving an accessory device. In some examples, the housing or support may be positioned within a vehicle door. An accessory cradle or cup received within the housing or support may have one or more accessory retention clips configured to retain an accessory device within the cradle. The apparatus may also include a pin follower engaged with a track to delimit movement of the accessory cradle within the cavity between stowed and deployed positions. A spring and corresponding spring pin may cause the accessory cradle to automatically move between stowed and deployed positions in response to a force applied to the accessory cradle and/or the accessory device when engaged with the accessory cradle. A damper gear may engage with a rack of the accessory cradle to facilitate a controlled movement of the accessory cradle. Mechanisms may be provided to prevent a stowed accessory device from deploying in response to vehicle movement, such as an acceleration or deceleration of the vehicle that may otherwise cause the accessory cradle to be released from the stowed position. For example, a passive lock or "g-lock" may be provided that obstructs movement of the accessory cradle due to a vehicle deceleration. Additionally, retention clips of the accessory cradle may be locked into an engaged position with an accessory device, preventing the accessory device from being dislodged from the accessory cradle in response to a vehicle movement, such as an acceleration or deceleration of the vehicle that may otherwise cause the accessory device to be loosened or withdrawn from the accessory cradle. A printed circuit board assembly (PCBA) may be provided with pins for engaging the accessory to provide electrical power from the vehicle, e.g., by way of axially collapsible "pogo-pins."

Referring now to FIG. 1, an illustrative door assembly 100 for a vehicle is shown. The door assembly 100 includes a closure panel or door 102 that is movable between a closed position and an open position. The example illustrated in FIG. 1 is a front driver-side door of a vehicle having a front end 104 and a rear end 108, i.e., such that the front end 104 of the door 102 is positioned forward of the rear end 108 of the door 102 when the door 102 is in a closed position on the vehicle. While the examples herein are disclosed in the context of a front driver-side door, other examples may be employed on other vehicle doors, e.g., passenger or rear doors. Moreover, examples may be applied in the context of a vehicle liftgate, tailgate, interior storage area doors, or any other closure mechanism that is convenient. One or more hinges (not shown) may be provided at a front edge 104 of the door 102 that allow the door 102 to pivot with respect to a vehicle body (not shown), to facilitate opening and closing the door 102. A latch assembly 106 may be provided at a rear end 108 of the door 102. The latch assembly 106 may retain a striker of a vehicle body (not shown) to secure the door 102 in a closed position on the vehicle body. A trim panel 110 of the door 102 includes a handle 112 for pulling the door 102 to the closed position and controls 114 for operating vehicle windows and/or mirrors or the like. The latch assembly 106 may be released from a door striker by way of a handle, solenoid, or other mechanism for actuating the latch assembly 106, thereby allowing the door 102 to be opened.

The trim panel 110 includes an interior-facing portion 116 which is visible when the door 102 is in a closed position. By contrast, an end portion 118 (e.g., as defined by dashed lines in FIG. 1) of the trim panel 110 may be generally covered, obstructed, or out of view from within the vehicle interior when the door 102 is closed. For example, the end portion 118 may be at the rear end 108 of the door 102 and may face generally rearwardly in the vehicle. As such, when the door 102 is closed the end portion 118 may be positioned adjacent another vehicle trim panel, pillar structure, or the like such that the end portion 118 is out of view to interior occupants of the vehicle. A trim ring 120 defines an opening 126 in the end portion 118 of the trim panel 110, which allows access to a cavity 122 that is within the door 102. An accessory storage apparatus 124 is positioned within the cavity 122, which will be described further below. As a result of the position of the accessory storage apparatus 124 within the cavity 122 and the position of the opening 126 on the end portion 118 of the trim panel 110 (which is covered when the door 102 is closed), the accessory storage apparatus 124 and opening 126 are generally hidden from view by vehicle occupants when the door 102 is closed. Access to the cavity 122 may also be prevented when the door 102 is closed, e.g., by an adjacent trim panel, door opening in vehicle body, pillar structure, or the like which is positioned relatively closely to the end portion 118 of the door 102, thereby covering the opening 126 and hiding an accessory device stowed within the cavity 122 from view by interior occupants of the vehicle, and also preventing removal of the accessory device the cavity 122. As will be discussed further below, an accessory device may protrude out of the cavity 122 when in a deployed position. The door 102 may be prevented from closing when the accessory device protrudes from the cavity 122, e.g., due to interference or contact between the accessory device and the vehicle body, e.g., pillar structure, trim panel, or the like. As such, in some example approaches the door 102 may be closed only when the accessory device 128 does not protrude through the opening 126, either by (1) the accessory device not being present in the cavity 122 or (2) the accessory device being in a stowed position within the cavity 122. While the examples illustrated herein show the cavity 122 being provided adjacent the latch assembly 106 and the opening 126 being present in the end portion 118 of the door 102, in other example approaches cavities and/or openings may be positioned in other areas of the door 102, on other closure panels of the exterior or interior of the vehicle, or on the vehicle body. Merely as one example, another example cavity 122' (dashed lines) may be provided that extends through a rear perimeter area 129 of the door 102 adjacent the rear end 108 of the door 102, with the cavity 122' having an opening 126' in a map pocket rear surface 127. In another alternative example, a cavity 122" (dashed lines) is positioned in a forward area 131 adjacent the front end 104 of the door 102, with an opening 126" of the cavity 122" provided in a forward map pocket surface 133 of the trim panel 110. By providing the openings 126' and 126" in the interior-facing portion 116 of the trim panel 110 (rather than covered portion 118), an accessory device stowed in the cavities 122' or 122", respectively, may be accessed or removed when the door 102 is closed (or, for that matter, when the door 102 is open). Additionally, an accessory device protruding from either of the cavities 122' and 122" would also not obstruct movement of the door 102 between open and closed positions.

Figure 2:
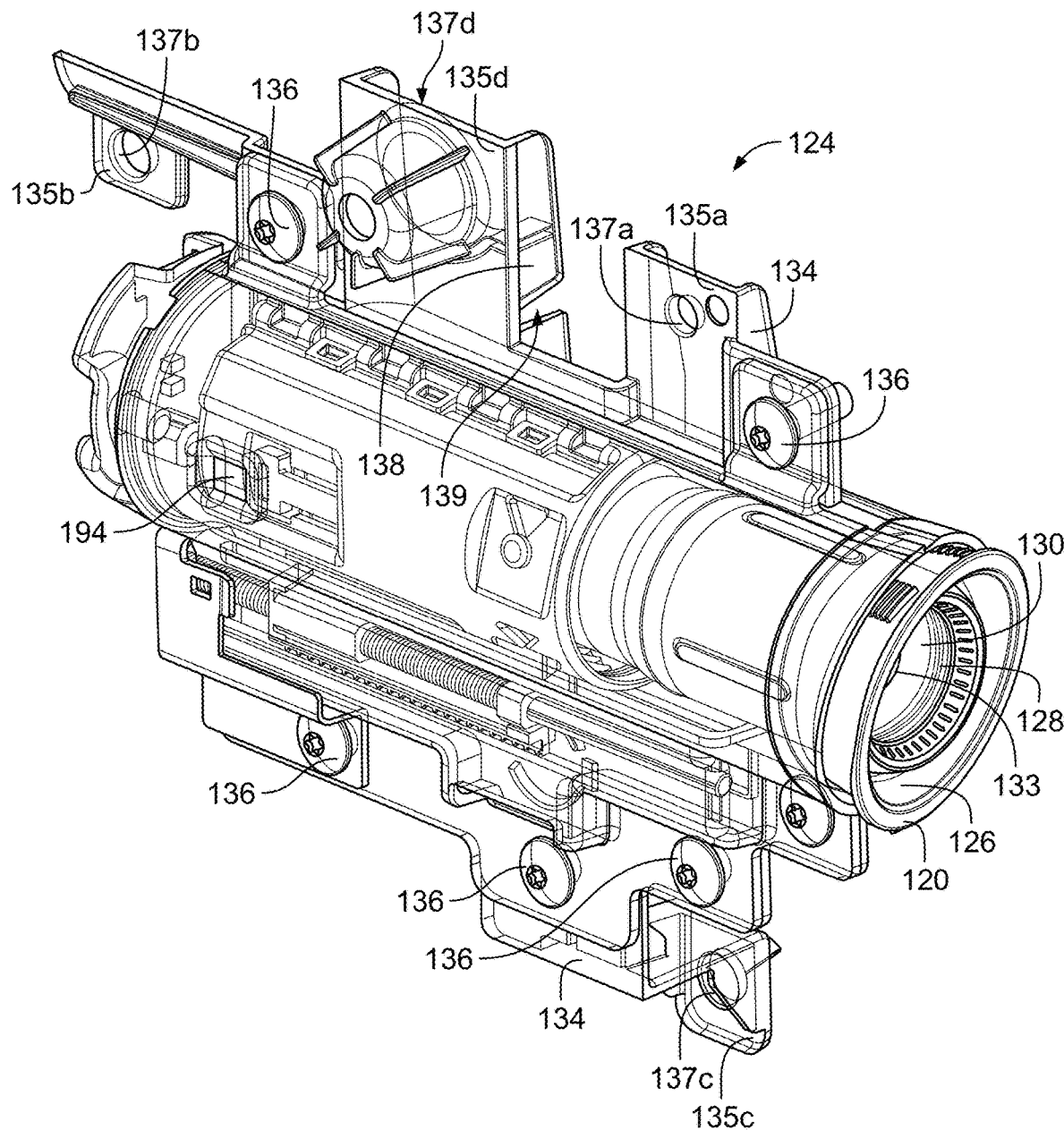
FIG. 2 shows a left-rear perspective view of an apparatus for storing an accessory device, e.g., within the vehicle door of FIG. 1, according to an example.

Turning now to FIGS. 2-5, the accessory storage apparatus 124 is illustrated and described in further detail, with the structure of the door 102 removed for visibility of the apparatus 124 and components thereof. The apparatus 124 is illustrated in FIG. 2 with an accessory device 128 in a stowed position within the apparatus 124. In the example illustrated, the accessory device is a flashlight having a lens assembly 130 for focusing light emitted by a bulb 133. The accessory device 128 may thus have an internal battery (not shown) configured to power the bulb 133. As will be discussed further below, the accessory device 128 may receive electrical power from the door 102 and/or vehicle when in the stowed position shown in FIG. 2, to allow charging of the accessory device 128 and/or battery of the accessory device 128.

Generally, the apparatus 124 may define at least in part the cavity 122 in which the accessory device 128 may be received. In the example illustrated, apparatus 124 includes a support 134 that is fixed to the door 102 (not shown in FIG. 2 or 3), e.g., a door beam or other internal structural member of the door 102, with one or more threaded fasteners (not shown in FIG. 2). More specifically, bosses 135a, 135b, 135c, and 135d (collectively, 135) may each define respective apertures 137a, 137b, 137c, and 137d (collectively, 137) for receiving a threaded fastener, thereby allowing the apparatus 124 to be secured to the door 102 or components thereof, e.g., trim panel 110. The support 134 cooperates with a cover 138 (which is secured to the support 134 with fasteners 136) to define the cavity 122.

Figure 4:
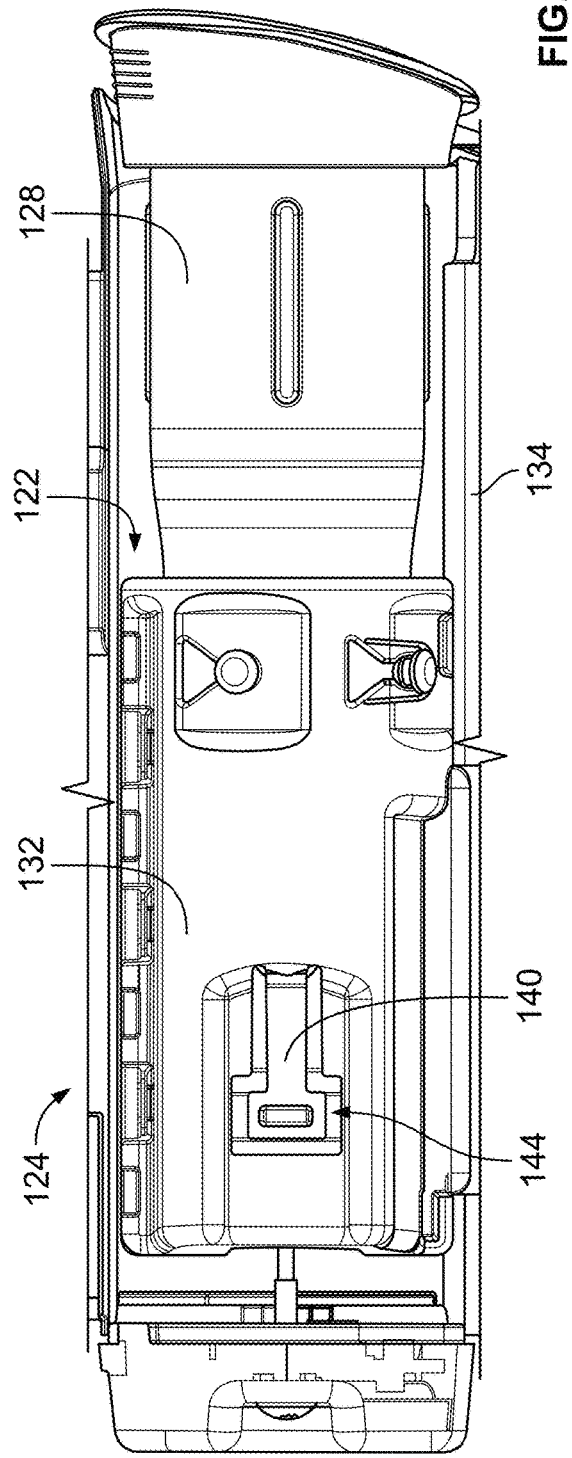
FIG. 4 is a left-side view of the apparatus of FIGS. 2-3, with an accessory device in a stowed position in the cavity of the vehicle door of FIG. 1, according to an example approach.
Figure 5:
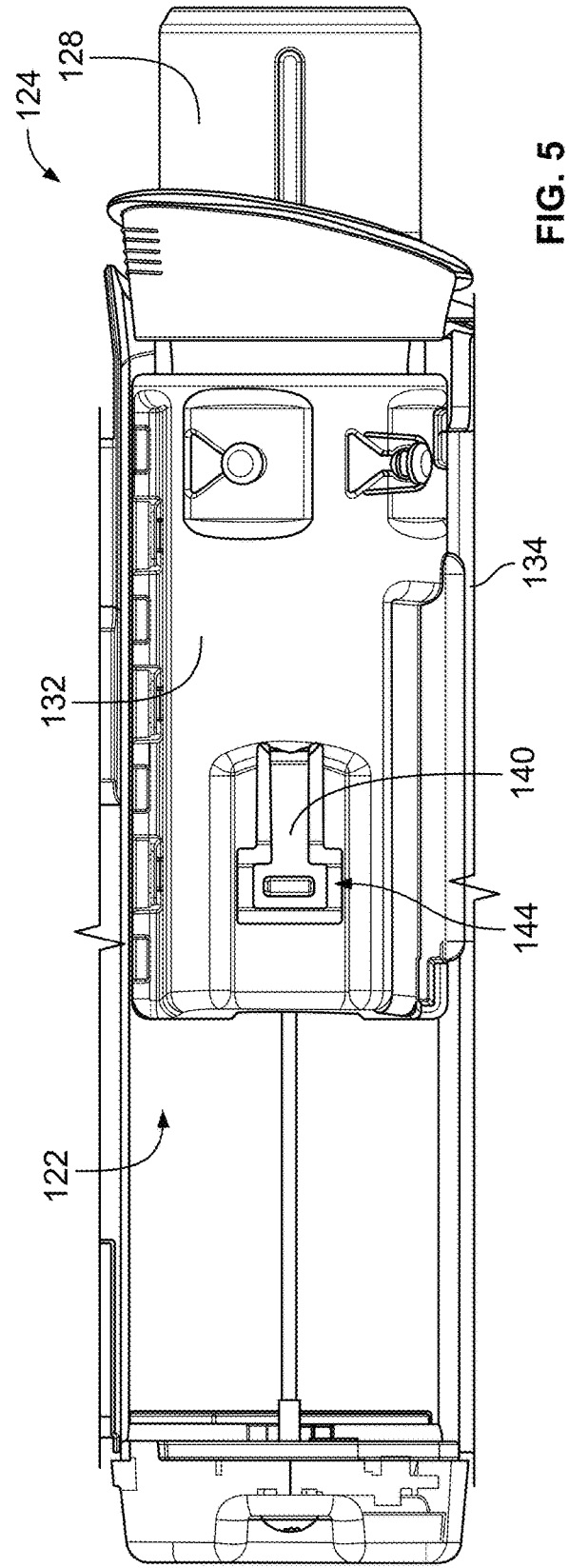
FIG. 5 is a left-side view of the apparatus of FIGS. 2-4, with the accessory device in a deployed position in the vehicle door of FIG. 1, according to one example illustration.
Figure 6:
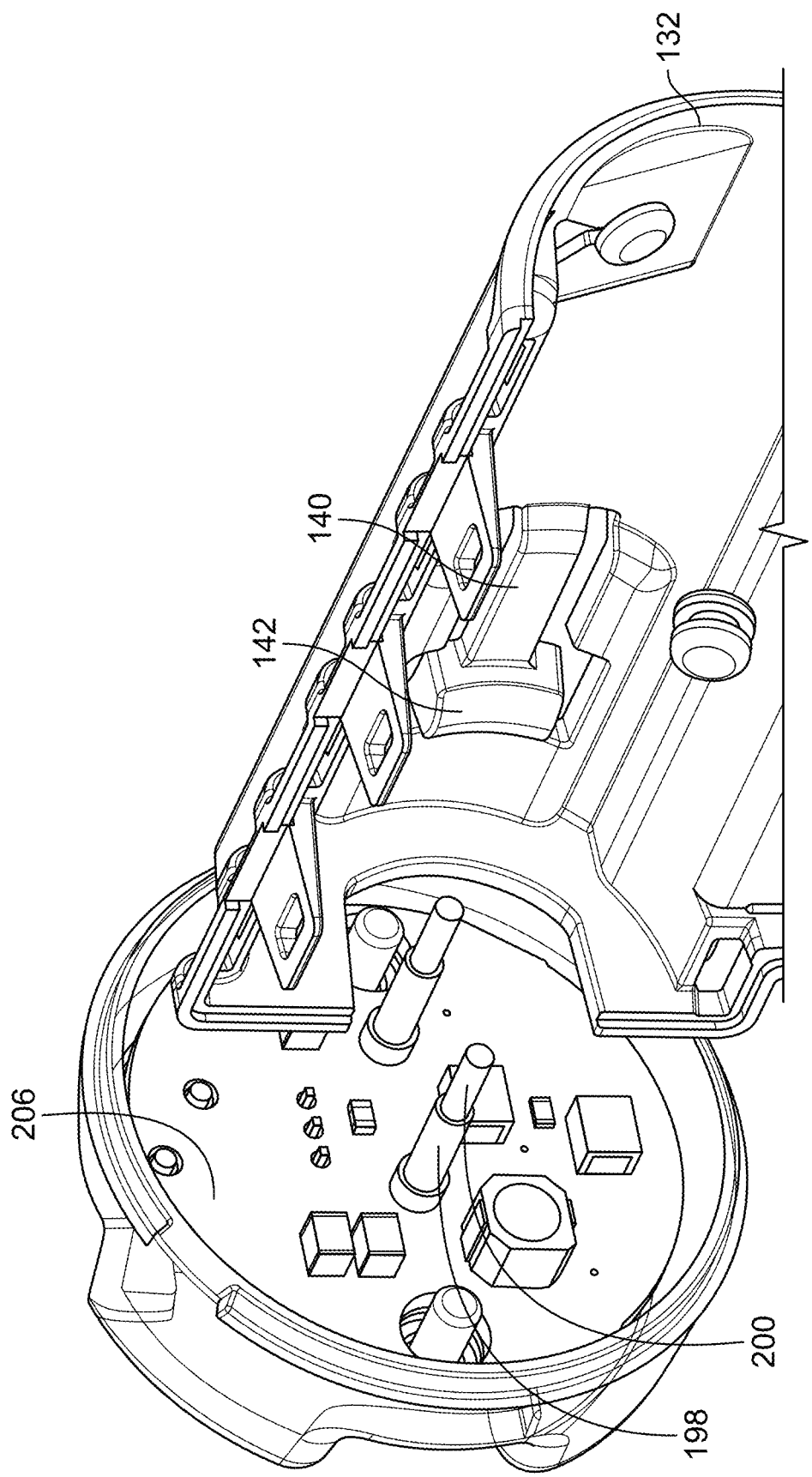
FIG. 6 is a left-rear perspective view of the apparatus of FIGS. 2-5, with some components removed to show a charging module and a retention clip of an accessory cradle, according to an example.

An accessory cradle 132 within the cavity 122 is movable with respect to the support 134 and cover 138 between a stowed position (FIGS. 3 and 4) and a deployed position (FIG. 5), as will be discussed further below. The accessory cradle 132 is configured to retain the vehicle accessory 128, such that the accessory device 128 may move with the accessory cradle 132 as the accessory cradle 132 moves within the cavity 122 between the stowed position and the deployed position. More specifically, one or more retention clips 140 are configured to engage with corresponding pockets, grooves, or the like of the accessory device 128. As best seen in FIGS. 4-6, the retention clips 140 each define a radially inwardly facing curved surface 142, which is received in a circumferential groove 144 of the accessory device 128 when the accessory device 128 is received within the accessory cradle 132. The support 134 and retention clip(s) 140 may be formed, merely by way of example, in a molding process from a plastic or nylon material, with the retention clips 140 being configured to deflect radially outwardly from the accessory device 128 upon insertion into the cavity 122. That is, as the accessory device 128 is slid axially into the accessory cradle 132, the curved surface 142 rides along a radially outer surface of the accessory device 128, with the retention clip 140 bending or deflecting radially outwardly by the contact between the accessory device 128 and the curved surface 142. As the accessory device 128 is inserted into the accessory cradle 132, the curved surface 142 may eventually "snap" or otherwise come to rest within the circumferential groove 144 of the accessory device, thereby retaining the accessory device 128 within the accessory cradle 132. The accessory device 128 may be removed from the accessory cradle 132 by reversing the process, i.e., by grasping the accessory device 128 and pulling the accessory device 128 out from the cavity 122 to overcome the retention force of the engagement of the retention clip(s) 140 in the groove 144 of the accessory device 128. More specifically, the retention clips 140 may deflect radially outwardly from the accessory device 128 and/or the circumferential groove 144, allowing withdrawal of the accessory device 128 from the accessory cradle 132. Generally, the retention clips 140 may have a relatively small force to insert the accessory device 128 into the accessory cradle 132, while having enough holding power from the engagement of the retention clip 140 with the circumferential groove 144 to prevent the accessory device 128 from being loose within the accessory cradle 132. With the accessory device 128 seated within the accessory cradle 132 and the retention clip(s) 140 engaged with the circumferential groove 144, the accessory device 128 and accessory cradle 132 may generally move together within the cavity 122.

Figure 3:
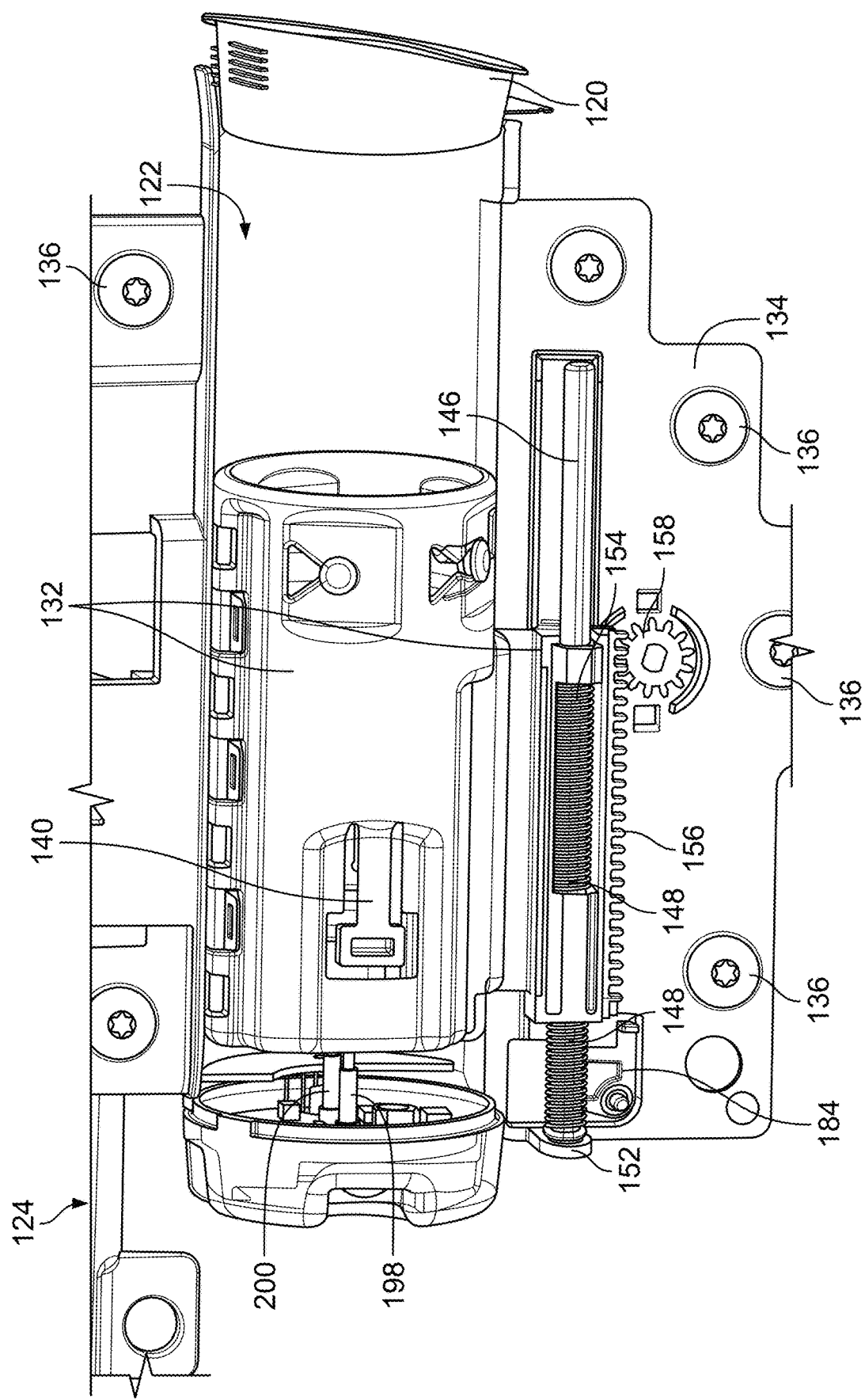
FIG. 3 shows a partial cutaway left-side perspective view of the apparatus of FIG. 2, according to one example illustration.
Figure 7A:
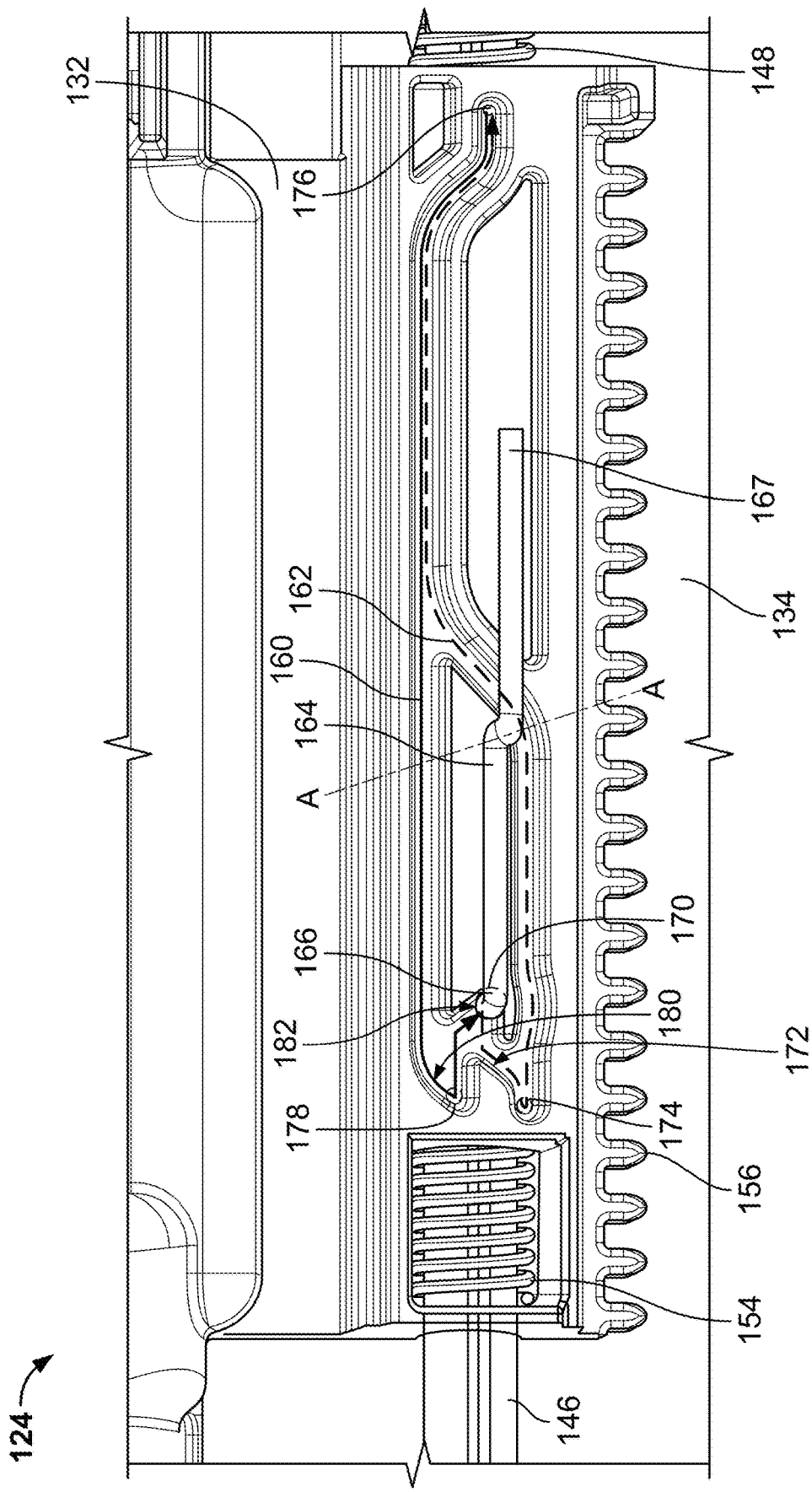
FIG. 7A shows an enlarged right-side perspective view of a stowing track and deployment track for the apparatus of FIGS. 2-6, with an engagement end of a rotatable pin in the tracks such that the accessory cradle and/or accessory device are in a stowed position, according to one example approach.
Figure 8:
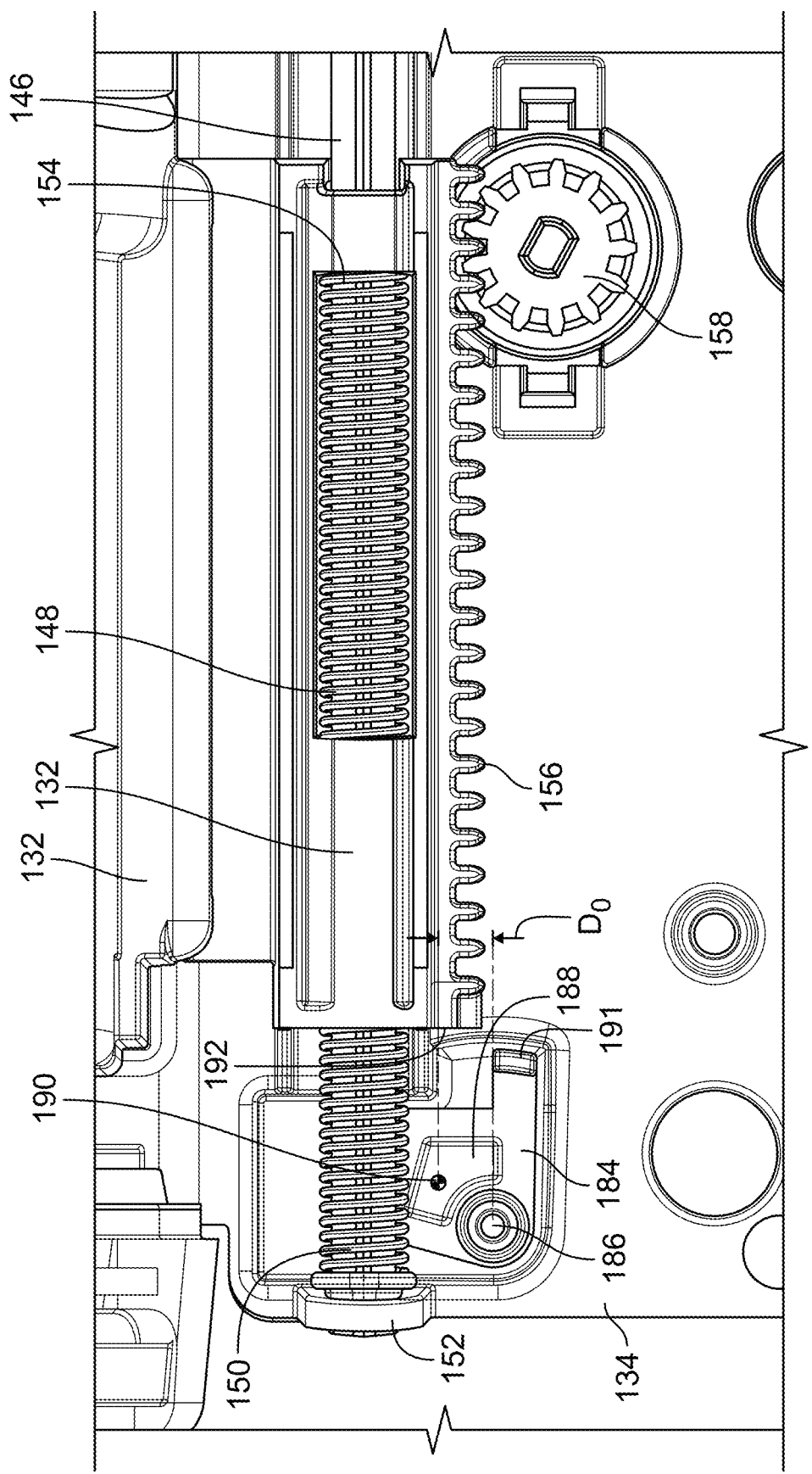
FIG. 8 shows an enlarged left-side view of the apparatus of FIGS. 2-4 to illustrate a damper gear, rack, and passive lock of the apparatus, according to an example.

Referring now to FIGS. 3, 7, and 8, as noted above the accessory cradle 132 is movable with respect to the support 134 and/or door 102 (not shown). In the example illustrated, the accessory cradle 132 is slidable along a guide pin 146 between the stowed and deployed positions. The guide pin 146 is fixed to the support 134. A spring 148 or other elastic or compliant element may be concentrically received on the guide pin 146. A stationary end 150 of the spring 148 contacts a base 152 of the guide pin 146. The opposite end 154 of the spring 148 engages the accessory cradle. Accordingly, a compression force of the spring 148 generally urges the accessory cradle 132 from the stowed position toward the deployed position. The accessory cradle 132 may also have a rack 156 enmeshed with a damper gear 158. The damper gear 158 and rack 156 may generally facilitate a controlled, smooth movement of the accessory cradle 132 in response to the force applied to the accessory cradle 132 by the spring 148. More specifically, the damper gear 158 generally limits acceleration of the rack 156 and/or accessory cradle 132 caused by the spring force applied to the accessory cradle 132 by the spring 148.

Referring now to FIGS. 7A-7C, an enlarged right-side perspective view of a stowing track 160 and a deployment track 162 for the apparatus 124 is illustrated. Generally, the accessory device 128 may be accessible via a "push-push" mechanism of the accessory cradle 132. The accessory cradle 132 may thereby move the accessory device 128 from a stowed position (in which the accessory device 128 is entirely within the cavity 122) to a deployed position (in which the accessory device 128 protrudes from the cavity 122) to allow a user to withdraw the accessory device 128 from the accessory cradle 132 and/or the cavity 122. The example stowing track 160 and deployment track 162 are defined by the accessory cradle 132. A pin or pin follower 164 with an engagement end 166 is received in each of the stowing track 160 and deployment track 162, to generally delimit movement of the accessory cradle 132. More specifically, the engagement end 166 may generally follow the stowing track 160 as the accessory cradle 132 is pushed deeper into the cavity 122, e.g., when accessory device 128 is inserted into the cavity 122. The engagement end 166 may then follow the deployment track 162 as the accessory cradle 132 moves from the stowed position to the deployed position. In the example illustrated in FIGS. 7A-7C, the pin 164 is fixed in an axial direction with respect to the generally cylindrically shaped cavity 122 of the support 134, but rotates about an axis A-A, with a counterweight end 167 of the pin extending away from the axis A-A opposite the engagement end 166. The rotatable support of the pin 164 generally allows the engagement end 166 of the pin 164 to follow the stowing track 160 and deployment track 162. More specifically, as will be described further below, the engagement end 166 follows the stowing track 160 and deployment track 162 as the accessory cradle 132 moves with respect to the support 134 within the cavity 122. The counterweight end 167 may generally provide a counterweight to the engagement end 166 with respect to the axis A-A during rotation of the pin 164, thereby minimizing resistance of the pin 164 to rotation imparted by the stowing track 160 and/or deployment track 162. While the stowing track 160 and deployment track 162 are each defined by the accessory cradle 132 with the pin 164 mounted on the support 134 in the illustrated example, other examples may employ an opposite approach, i.e., with stowing and/or deployment tracks defined by a stationary component such as the support, and the pin on a movable component such as the accessory cradle.

As shown in FIG. 7A, with the accessory cradle 132 in the stowed position illustrated, the engagement end 166 of the pin 164 is stably received in a stowed pocket 170, which defines a beginning point of the deployment track 162. A single "press" of the accessory device 128 in a direction into the cavity 122 moves the engagement end 166 out of the stowed pocket 170. An angled end 172 of the deployment track 162 causes the engagement end 166 to be pushed downward and into a deployment end 174 of the deployment track 162, rotating the pin 164 about the axis A-A. The user may then release the accessory device 128, and the spring 148 causes the accessory cradle 132 to move along the deployment track 162 as seen in FIG. 7B. The engagement end 166 is eventually received in an opposite end pocket 176, which coincides with the deployment track 162 and stowing track 160. As this point, the accessory cradle 132 is in a deployed position, with the accessory device 128 protruding from the cavity 122 (see FIG. 5) so that a user may withdraw the accessory device 128 from the accessory cradle 132 for use. The accessory device 128 may then be inserted back into the accessory cradle 132, and the accessory device 128 may be "pushed" into the cavity 122 by the user for stowing. As the user pushes the accessory device 128 further into the cavity 122, the engagement end 166 of the pin 164 follows the stowing track 160, as seen in FIG. 7C. As the user continues to push the accessory device 128 into the cavity 122, the engagement end 166 is eventually received at an end 178 of the stowing track 160. An angled surface 180 urges the engagement end 166 downward, rotating the pin 164 about the axis A-A. A release of the accessory device 128 by the user (and spring force applied by the spring 148) causes the accessory cradle 132 to reverse direction, and the engagement end 166 is drawn into the stowed pocket 170 by angled surface 182, e.g., as illustrated in FIG. 7A. Accordingly, the accessory cradle 132 is again stably held in the stowed position, with the accessory device 128 securely retained in the accessory cradle 132 and positioned entirely within the cavity 122.

The foregoing example stowing track 160 and deployment track 162 are configured to maintain the accessory cradle 132 in an inserted or stowed position within the cavity 122 in response to a first insertion movement of the accessory cradle, i.e., after the accessory device 128 is initially inserted into the accessory cradle 132, the accessory device 128 and accessory cradle 132 are pushed into the cavity 122 to bring the engagement end 166 of the pin 164 into the stowed pocket 170. Further, the deployment track 162 is configured to guide the accessory cradle 132 to a deployed position in response to a second insertion movement of the accessory cradle 132 when the accessory cradle 132 is in the stowed position. In this manner, the accessory cradle 132 facilitates a "push-push" securement and release of the accessory device 128.

Figure 9:
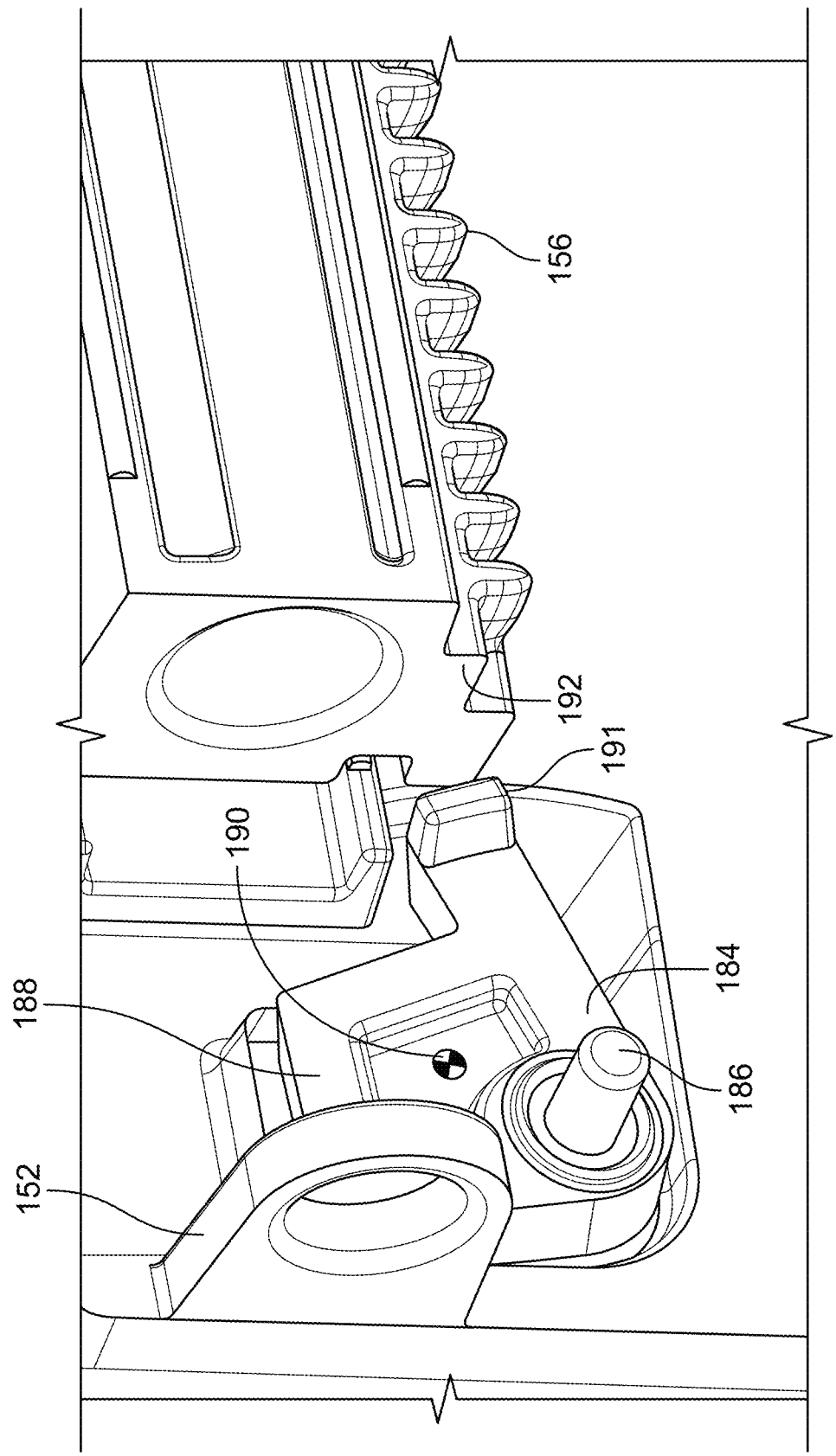
FIG. 9 is an enlarged left-side perspective view of the passive lock of FIG. 5, according to one example approach.

Referring now to FIGS. 3, 8, and 9, a passive locking mechanism or "g-lock" of the apparatus 124 is illustrated and described in further detail. As illustrated in FIGS. 1 and 2, the cylindrical cavity 122 may be aligned in a longitudinal direction of the vehicle, and as such a movement of the vehicle causing a longitudinal acceleration and/or deceleration may be applied to the accessory cradle 132 and/or the accessory device 128. It is desired to prevent the accessory cradle 132 from being dislodged or moved out of the stowed position, to reduce the possibility the accessory device 128 is damaged or interferes with operation of the door 102. Accordingly, a passive lock 184 is provided, which is configured to prevent movement of the accessory cradle 132 to the deployed position in response to a vehicle acceleration. In the example illustrated, the passive lock 184 is rotatably mounted on a lateral pin 186 and has an offset body 188 with a center of gravity 190. The center of gravity 190 is offset from the pin 186 by an offset distance $D_O$ in a direction normal to a movement direction of the accessory cradle 132 within the cavity 122, as best seen in FIG. 8. More specifically, the accessory cradle 132 moves axially along guide pin 146 within the cavity 122. The center of gravity 190 of the offset body 188 is vertically displaced from the axis of rotation of the offset body 188 about the lateral pin 186 by the offset distance $D_O$. As a result, a deceleration of the vehicle can cause the offset body 188 to rotate about the lateral pin 186. As seen in FIG. 9, rotation of the offset body 188 brings a lateral arm 191 upward, such that movement of the accessory cradle 132 sufficient to disengage the accessory cradle 132 from the stowed position is prevented. More specifically, if the accessory cradle 132 is caused to move deeper into the cavity 122 by the vehicle movement, e.g., a sudden deceleration, an end face 192 of the accessory cradle 132 comes into contact with the lateral arm 191 of the passive lock 184 before the engagement end 166 of the pin 164 travels far enough in the deployment track 162 to prevent the engagement end 166 from returning directly to the stowed pocket 170 (e.g., by contacting the angled surface 182 and/or being forced to the deployment end 174 of the deployment track 162). As a result of the lateral arm 191 stopping further movement of the accessory cradle 132, the accessory cradle 132 is prevented from becoming dislodged from the stowed position. Additionally, the passive lock 184 freely rotates downward after the deceleration/crash event has concluded, thereby permitting subsequent normal operation of the accessory cradle 132. Accordingly, removal of the accessory device 128 may be initiated with push into the cavity 122, thereby causing the accessory cradle 132 to move to the deployed position and allow withdrawal of the accessory device 128 from the accessory cradle 132.

As noted above, the retention clip 140 generally prevents the accessory device 128 from being dislodged from the accessory cradle 132, but may also permit a relatively easy withdrawal of the accessory device from the accessory cradle 132, e.g., upon a user firmly grasping the accessory device 128 and pulling the accessory device 128 out of the cavity 122/accessory cradle 132 when the accessory cradle 132 is in the deployed position. The retention clip(s) 140 alone may not be strong enough to resist the accessory device 128 being dislodged from the accessory cradle in response to a strong or sudden vehicle movement or acceleration, e.g., caused by a rear impact to the vehicle. Accordingly, as seen in FIG. 2 the cover 138 may have a backing cup 194 that is aligned with the retention clip 140 when the accessory cradle 132 is in the stowed position. The backing cup 194 generally prevents radially outward deflection of the retention clip 140, thereby preventing the curved surface 142 from being dislodged from the circumferential groove 144 of the accessory device 128. As a result, the accessory device 128 is generally prevented from being dislodged from the accessory cradle 132 while the accessory cradle 132 is in the stowed position.

Figure 10:
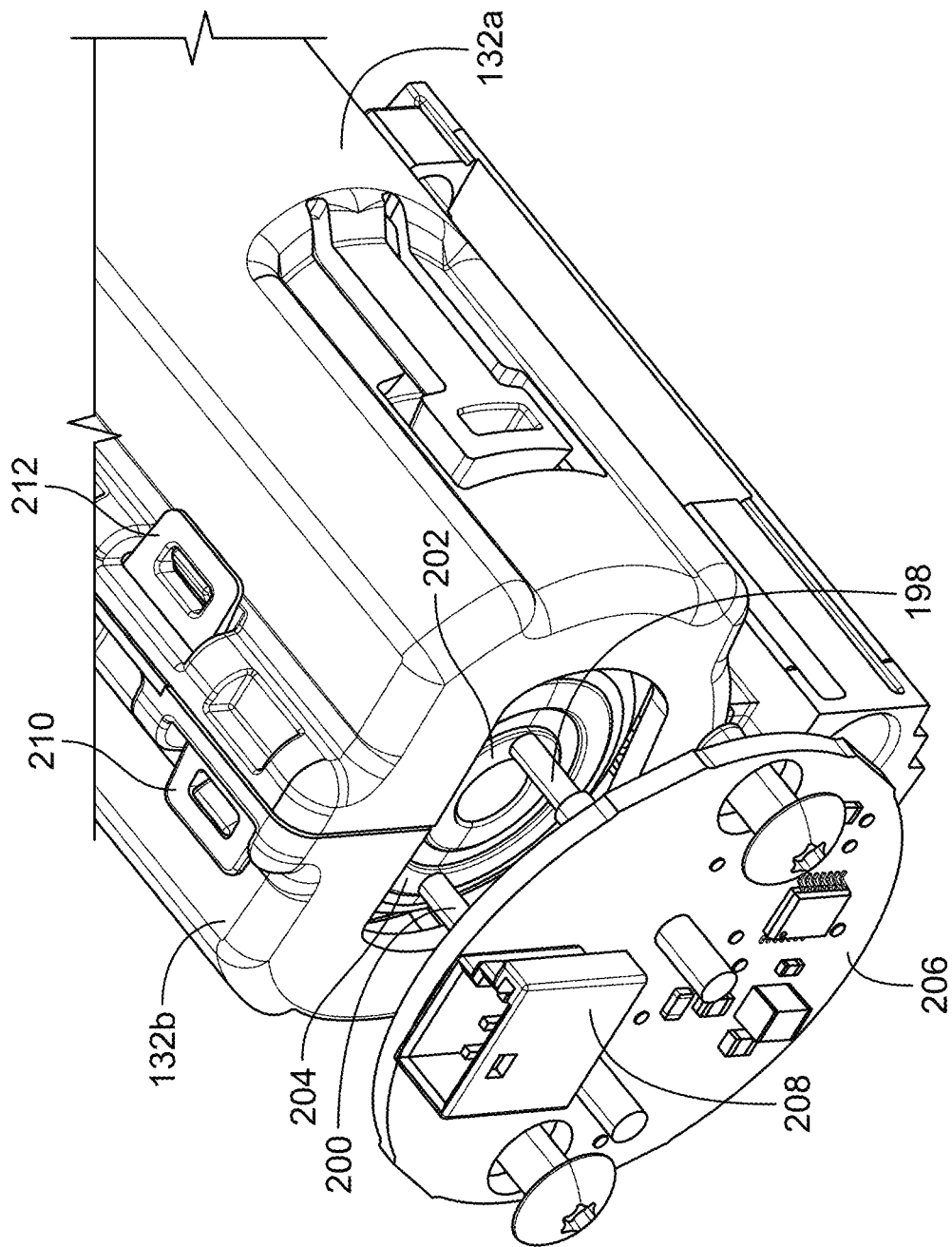
FIG. 10 is a front upper left-side perspective view of the apparatus of FIGS. 2-9, with the accessory device in a stowed position and charging pins of the apparatus engaged with charge pads of the accessory device.

As noted above, the apparatus 124 provides electronic charging of the accessory device 128 when in the stowed position. Referring now to FIGS. 3, 6, and 10, the apparatus 124 may have two "pogo-pins" 198, 200 for supplying charging power to the accessory device 128. More specifically, the accessory device 128 may have charge contacts or pads 202, 204 which are drawn into contact with the pins 198, 200, respectively. The pins 198, 200 are each extendable to allow resilient contact with the charge pads 202, 204. Moreover, the charge pads 202, 204 are provided in the shape of concentric circles on the end of the accessory device 128, and as such the pins 198, 200 remain in contact with their respective charge pads 202, 204 regardless of a rotational position of the accessory device 128. More specifically, the pins 198, 200 are radially spaced apart with respect to the cylindrical shape of the cavity 122 and/or the accessory cradle 132, such that each pin 198, 200 engages a respective charge pad 202, 204 regardless of the rotational orientation of the accessory device 128 when inserted into the stowed position (e.g., as illustrated in FIG. 10). Axial deflection of the pins 198, 200 may also allow the accessory device 128 to be pushed into the cavity 122 slightly when in the stowed position in the cavity 122, e.g., to allow actuation of the "push-push" deployment movement of the accessory cradle 132 described above. One of the charging pins, e.g., charging pin 198, is a positive charging pin, while the other charging pin 200 is a negative charging pin. The charging pins 198, 200 are each in electrical contact with a printed circuit board assembly (PCBA) 206. The PCBA 206 may have a connector 208 configured to receive electrical power from the vehicle.

Figure 11:
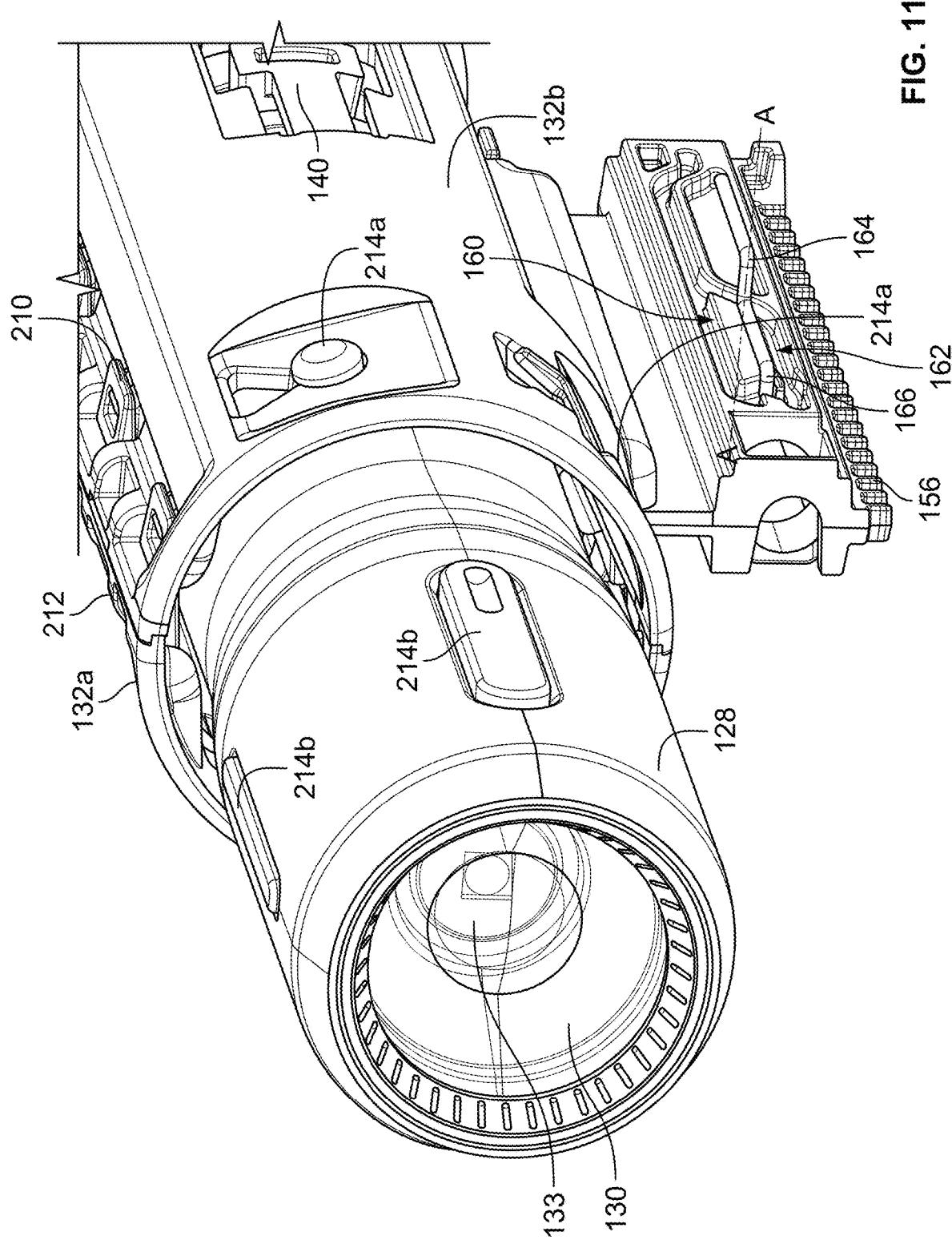
FIG. 11 is a rear upper right-side perspective view of the accessory cradle of the apparatus of FIGS. 2-10, with the accessory device received in the accessory cradle, according to an example.

Turning now to FIGS. 10 and 11, the accessory device 128 is shown positioned in the accessory cradle 132. In the example illustrated, the accessory cradle 132 is formed of separate halves 132a and 132b, which may be assembled together to form the accessory cradle 132. Retention clips 210, 212 of the accessory cradle halves 132a, 132b may be clipped on to corresponding hooks or other engagement features of the other accessory cradle half 132b, 132a, respectively. As best seen in FIG. 11, the accessory device 128 and/or the accessory cradle 132 may have relatively compliant elements or bumpers 214, which may generally prevent rattling or other noise, e.g., as may be caused by vehicle vibrations during driving. More specifically, the accessory cradle 132 includes bumpers 214a received about a perimeter of the accessory device 128. The bumpers 214a are positioned within the accessory cradle 132, and as such do not interfere with movement of the accessory cradle 132 or the accessory device 128 within the cavity 122 (not shown in FIG. 11). The accessory device 128 may also have bumpers 214b which are configured to interface with the cavity 122 or other components of the apparatus 124 and/or door 102. Each of the bumpers 214 may be formed of a compliant material such as rubber, plastic, or any other material configured to prevent rattling of the accessory device 128 and/or accessory cradle 132 when stowed within the cavity 122.

Referring again to FIG. 2, the accessory cradle 132 and support 134 may be configured to prevent binding that might inhibit or prevent movement of the accessory cradle 132 within the cavity 122. To the extent the support 134, cover 138, or structural members of the door 102 defining the cavity 122 may deflect during installation of the apparatus 124 or may need to absorb tolerances in components of the door 102 or apparatus 124, it may be desirable to allow for compliance in components of the apparatus 124 such as the support 134. In the example illustrated, the support 134 is secured to structure of the door 102 by way of the bosses 135a, 135b, 135c, and 135d and their corresponding apertures 137a, 137b, 137c, and 137d, respectively. More specifically, a threaded fastener (not shown) may be received in the apertures 137 to secure the support 134 to the door 102 or components thereof, e.g., a door beam, trim panel 110, or the like. In the example illustrated, fasteners may be inserted into the apertures 137a, 137b, and 137c in a different or opposing direction than a fastener for aperture 137d. Tightening fasteners in the apertures 137 to the door 102 or components thereof may, as a result, cause a twisting force to be applied to the support 134. Additionally, components of the door 102 to which the bosses 135 are secured may have positional tolerances. The twisting force and/or tolerances in surrounding components of the door 102 may cause deflection of the support 134 or other components of the apparatus 124, and in extreme examples may distort the interior shape of the support 134, potentially creating interference, friction, or binding between the accessory cradle 132 and surrounding components, e.g., the support 134 or cover 138. To reduce the possibility of such binding or excess friction, the bosses 135b, 135c, and 135d may be made relatively more compliant structurally in comparison to a "primary" boss 135a, thereby allowing the bosses 135b, 135c, 135d to deflect more easily than the boss 135a during installation of the apparatus 124. Merely by way of example, the boss 135d includes a gap 139 in stanchion 138, thereby allowing the boss 135d to more easily deflect during installation of the support 134. To the extent one or more of the bosses 135 can deflect or absorb tolerances in this manner, the cavity 122 defined by the support 134 may be less likely to be bent or misshaped during installation, reducing the likelihood of interference or excess friction between the accessory cradle 132 and the support 134.

Figure 12:
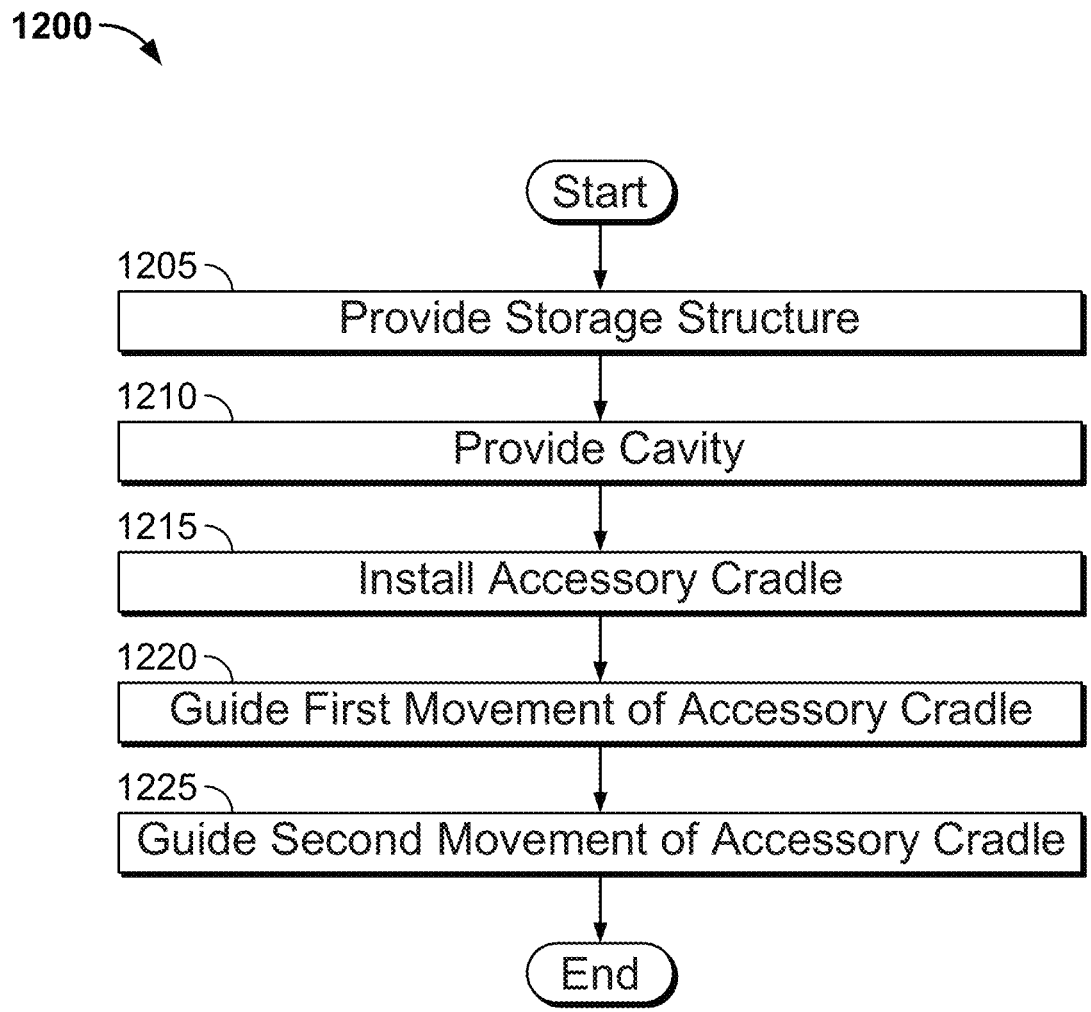
FIG. 12 is a process flow diagram for an example method of manufacturing a door for a vehicle, according to an example illustration.

Turning now to FIG. 12, an example process 1200 is illustrated for providing a storage cavity for an accessory device, according to an example illustration. Process 1200 may begin at block 1205, where a storage structure is provided. For example, as discussed above a door 102 may be provided that is a front driver-side door for a vehicle. Other doors or closure mechanisms of a vehicle may be employed, as noted above.

Proceeding to block 1210, a storage cavity may be provided. For example, as discussed above a cavity 122 may be provided in a door adjacent a latch 106 of the door 102, in an end portion of the door 102. Cavities may be provided in other areas of the door 102 as well, e.g., in a rear perimeter area 129, or forward area 131 of a door 102, merely as examples. In some example approaches such as those discussed above, a cavity may be defined at least in part by a support 134, cover 138, and/or other structure of the door 102. The cavity may be accessible by way of an opening 126. In some example approaches, the opening 126 is in a covered portion 118 of a trim panel 110, and as such the cavity 122 may be concealed or otherwise inaccessible when the door 102 is in a closed position. In other examples, an opening 126' or 126" may be in other areas of a trim panel 110 that is not covered or obstructed when the door 102 is closed. The cavity 122 may be configured to stow and charge an accessory device 128, which as discussed above may be a flashlight or other electrically powered accessory. The support 134 may be affixed to an interior structure of the door 102, such that the support 134 is generally fixed with respect to the vehicle structure. Process 1200 may then proceed to block 1215.

At block 1215, an accessory cradle may be installed into the cavity. For example, as discussed above, accessory cradle 132 is movable within the cavity to allow translation of the accessory cradle within the cavity 122. Additionally, the accessory cradle 132 may be configured to retain the vehicle accessory within the accessory cradle 132, such that the accessory device moves within the cavity 122 with the accessory cradle 132. Further, to the extent the accessory device 128 protrudes from the cavity 122 when received in the accessory cradle 132, with the accessory cradle 132 in a deployed position, a user may effect movement of the accessory cradle 132 by manipulating the accessory device 128, e.g., by pushing the accessory device 128 into the cavity 122.

Proceeding to block 1220, a first movement of the accessory cradle may be guided within the cavity. For example, as discussed above, a stowing track 160 may be defined by the accessory cradle 132 or the support 134. A pin 164 may have an engagement end 166 received within the stowing track 160. Accordingly, as shown in FIGS. 7C and discussed above, with the accessory device 128 loaded into the accessory cradle 132, when a user inserts or pushes the accessory device 128 further into the cavity 122 the accessory cradle 132 is moved away from the opening 126 and deeper into the cavity 122, and the engagement end 166 follows the stowing track 160 until it is received in the stowed pocket 170. Upon the engagement end 166 reaching the stowed pocket 170, the accessory cradle 132 is stably held in position within the cavity 122, e.g., as illustrated in FIG. 7A, with the accessory device 128 completely contained within the cavity 122. Process 1200 may then proceed to block 1225.

At block 1225, the accessory cradle may be guided within the cavity to a deployed position in response to a second movement of the accessory cradle, e.g., initiated by a force applied to the accessory device. Continuing with the example above, with the accessory cradle 132 in the stowed position, a push of the accessory device 128 in a direction deeper into the cavity 122, i.e., in a same direction as the direction of insertion, may cause the engagement end 166 of the pin 164 to be moved out of the stowed pocket 170 and to reach a deployment end 174 of the deployment track 162. Releasing the accessory device 128 and/or accessory cradle 132 causes the engagement end 166 to continue along the deployment track 162, e.g., as illustrated in FIG. 7B. The spring 148 forces the accessory cradle 132 toward the opening 126 of the cavity 122, with the damper gear 158 limiting acceleration such that the movement of the accessory device 128 out of the opening 128 is relatively smooth and controlled. Accordingly, the second "push" movement of the accessory cradle 132 causes the accessory device 128 to reach a position such that an end of the accessory device 128 extends out of the cavity 122, and the accessory cradle 132 is in the deployed position.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. An apparatus, comprising:
a cavity defined by a vehicle door, wherein the cavity is configured to stow and charge an accessory device;
an accessory cradle movable within the cavity and configured to retain the accessory device; and
a spring configured to urge the accessory cradle out of the cavity.

2. The apparatus of claim 1, wherein the cavity is located adjacent to a latch assembly of the vehicle door, and wherein the vehicle door is configured to close based at least on the accessory device being stowed in the cavity or absent from an opening of the cavity, the opening of the cavity in the vehicle door.

3. The apparatus of claim 1, wherein the accessory device is a flashlight.

4. The apparatus of claim 1, further comprising a damping gear mated with a gear rack fixed to the accessory cradle.

5. The apparatus of claim 1, further comprising a support configured to be mounted within the vehicle door, the support defining in part the cavity, the accessory cradle movable with respect to the support.

6. The apparatus of claim 5, further comprising a stowing track and a deployment track, each of the stowing track and deployment track defined by one of the support or the accessory cradle, the stowing track configured to delimit movement of the accessory cradle within the cavity when the accessory device is inserted into the cavity, the deployment track configured to delimit movement of the accessory cradle when the accessory device is withdrawn from the cavity.

7. The apparatus of claim 6, wherein the stowing track is configured to maintain the accessory cradle in a stowed position within the cavity in response to a first insertion movement of the accessory cradle.

8. The apparatus of claim 7, wherein the deployment track is configured to guide the accessory cradle to a deployed position in response to a second insertion movement of the accessory cradle when the accessory cradle is in the stowed position.

9. The apparatus of claim 8, wherein the accessory device protrudes from the cavity when received in the accessory cradle and the accessory cradle is in the deployed position.

10. The apparatus of claim 8, further comprising a passive lock configured to prevent movement of the accessory cradle to the deployed position in response to a vehicle movement.

11. The apparatus of claim 1, further comprising a passive lock having an offset body rotatable about a pin, the offset body having a center of gravity offset from the pin in a direction normal to a movement direction of the accessory cradle within the cavity.

12. The apparatus of claim 1, further comprising a charging module configured to charge the accessory device when the accessory device is stowed within the cavity, the charging module including a positive charge pin and a negative charge pin, the positive charge pin and the negative charge pins configured to contact a positive charge contact and a negative charge contact of the accessory device, respectively, when the accessory device is inserted into the cavity, wherein the positive charge pin and the negative charge pin each are axially movable, wherein the positive charge pin and the negative charge pin are radially spaced apart for engaging concentric charge pads of the accessory device.

13. The apparatus of claim 1, wherein the accessory cradle includes at least one retention clip configured to engage the accessory device in a radial direction normal to an axial direction of movement of the accessory cradle within the cavity, thereby retaining the accessory device in the accessory cradle.

14. An apparatus, comprising:
a cavity defined by an end portion of a vehicle door, wherein the cavity is configured to stow and charge an accessory device;

an accessory cradle movable within the cavity and configured to retain the accessory device;

a support configured to be mounted within the vehicle door, the support defining in part the cavity, the accessory cradle movable with respect to the support; and a stowing track and a deployment track, each of the stowing track and deployment track defined by one of the support or the accessory cradle, the stowing track configured to delimit movement of the accessory cradle within the cavity when the accessory device is inserted into the cavity, the deployment track configured to delimit movement of the accessory cradle when the accessory device is withdrawn from the cavity.

15. A method, comprising:

providing a cavity in an end portion of a vehicle door, wherein the cavity is configured to stow and charge an accessory device;

installing an accessory cradle within the cavity, the accessory cradle movable within the cavity and configured to retain the accessory device; and installing a spring to urge the accessory cradle out of the cavity.

16. The method of claim 15, further comprising mounting a support within the vehicle door, the support defining in part the cavity, the accessory cradle movable with respect to the support.

17. The method of claim 16, further comprising guiding a first movement of the accessory cradle within the cavity with a stowing track in response to an insertion of the accessory device into the cavity.

18. The method of claim 17, further comprising guiding the accessory cradle within the cavity with a deployment track to a deployed position in response to a second movement of the accessory cradle initiated by a force applied to the accessory device, the second movement of the accessory cradle subsequent to the first movement of the accessory cradle, wherein the accessory device extends out of the cavity when the accessory cradle is in the deployed position.

19. The apparatus of claim 1, wherein the accessory device is a charging bank.

* * * * *